UNITED STATES PATENT OFFICE.

PAUL GONDOLO, OF PARIS, FRANCE, ASSIGNOR TO THE GONDOLO TANNIN COMPANY, OF HUNTINGDON, PENNSYLVANIA.

PROCESS OF MANUFACTURING TANNIN EXTRACTS.

SPECIFICATION forming part of Letters Patent No. 258,573, dated May 30, 1882.

Application filed December 10, 1881. (No specimens.) Patented in France March 12, 1879, No. 129,541; in England March 18, 1879, No. 1,070; in Belgium March 19, 1879, No. 47,694; in Germany April 2, 1879, No. 7,864; in Italy April 2, 1879, No. 10,827; in Austria April 7, 1879, No. 1,076, and in Spain July 28, 1879, No. 385.

*To all whom it may concern:*

Be it known that I, PAUL GONDOLO, of Paris, in the Republic of France, have invented certain new and useful Improvements in Processes of Manufacturing Tannin Extracts, of which improvements the following is a specification.

This invention is substantially set forth and contained in French Letters Patent No. 129,541, granted to me under date of March 12, 1879, for fifteen years, and in British Letters Patent No. 1,070, obtained on my behalf under date of March 18, 1879, for fourteen years.

The object of my improvement is to provide a means for extracting tannin from wood, roots, leaves, bark, husks, grain, fruit, and other vegetable matters, and to obtain the extract in a clear and soluble form, with but little coloring-matter.

My present invention consists in a modification of the process for manufacturing tannin extracts heretofore patented by me in Letters Patent of the United States No. 231,035, dated August 10, 1880, and is more especially adapted to the treatment of certain kinds of vegetable substances containing large quantities of coloring-matter combined with the tannin.

The process patented in the American Letters Patent referred to consists in the maceration of the vegetable matter in a bath of slightly-acidulated water, the subsequent neutralization of any free acid which remains, and the clarification of the resultant liquor by the admixture and coagulation of blood in the manner there described, and finally by filtration.

My present improvement consists in the addition directly to the slightly-acidulated maceration-bath at any desired moment of the operation of blood or other coagulant or absorbent, the subsequent addition of an alkali or alkaline salt, together with a further quantity of blood, and, finally, the precipitation of the coagulant or absorbent with the coloring-matter and alkaline salts by means of sulphuric acid.

In carrying out my invention I macerate the vegetable matter from which the tannin is to be extracted in a bath prepared, as described in my former American patent, by the addition of about six decigrams of acid (preferably sulphuric acid) to one liter of water. The quantity of the acid will vary in some degree according to the greater or less proportion of the lime or alkaline matter contained in the water used; but generally the proportions of acid and water above given will be found effectual. To the vegetable matter in the maceration-bath I add at any desired moment blood or other coagulant or absorbent, in about the following proportions: twenty grams of blood to each kilogram of vegetable matter under treatment. After the maceration is complete I add to the resulting liquors (at the same time well stirring them, and at a temperature between 55° and 80° centigrade) one gram of carbonate of soda, or an equivalent amount of other alkaline salt, and fifteen grams of blood for each liter of the liquor. When this admixture is complete I pour in gradually sulphuric acid in the proportion of six decigrams for each liter of the liquor resulting from the maceration-bath. As soon as this last addition is made a deposit takes place in flakes, wherein the salt of lime and the greater part of the coloring principle are contained. After the separation of the precipitate by filtration or otherwise the extract remaining is concentrated from 30° to 45° Baumé, and will be found rich in tannin, highly soluble, clear, and nearly free from color.

Having thus described my improvement, what I claim, and desire to secure by Letters Patent, is—

The hereinbefore-described improvement in the process of manufacturing tannin extracts, which consists in the maceration of the vegetable matters in a slightly-acidulated bath, the addition thereto of a coagulant or absorbent, the subsequent addition of an alkali or alkaline salt and of a further quantity of coagulant or absorbent, and the final precipitation by means of an acid, substantially as set forth.

P. GONDOLO.

Witnesses:
EDW. D. THURSTON,
TIMOTHY J. SHEA.